(12) United States Patent
Lee

(10) Patent No.: US 7,198,377 B2
(45) Date of Patent: Apr. 3, 2007

(54) METHOD OF PRODUCING A RETRO-REFLECTIVE HEAT TRANSFER FILM WITH A TRANSPARENT PROTECTIVE SHEET FOR WHOLE SURFACE

(76) Inventor: In-Hwan Lee, Lucky Apt. 1-1207, 707, OnCheon 2 dong, DongLae-Ku, Pusan (KR)

( * ) Notice: Subject to any disclaimer, the term of this patent is extended or adjusted under 35 U.S.C. 154(b) by 162 days.

(21) Appl. No.: 11/111,235

(22) Filed: Apr. 21, 2005

(65) Prior Publication Data

US 2006/0238871 A1    Oct. 26, 2006

(51) Int. Cl.
*G02B 5/128* (2006.01)
*C04B 37/00* (2006.01)
*B32B 27/00* (2006.01)

(52) U.S. Cl. .................. 359/536; 359/540; 359/541; 359/900; 156/325; 428/423.1; 428/423.7

(58) Field of Classification Search .................. None
See application file for complete search history.

(56) References Cited

U.S. PATENT DOCUMENTS

| 5,510,178 | A | * | 4/1996 | Olsen et al. | .............. 428/32.71 |
| 5,620,775 | A | * | 4/1997 | LaPerre | ...................... 428/149 |
| 5,820,988 | A | * | 10/1998 | Nagaoka | .................. 428/423.1 |

* cited by examiner

*Primary Examiner*—James Phan
(74) *Attorney, Agent, or Firm*—Notaro & Michalos P.C.

(57) ABSTRACT

A method of producing a retro-reflective heat transfer film includes heat-joining a PET release film and a transparent TPU sheet; forming a sticky-adhesive layer or a hot melt adhesive layer on the surface of the transparent TPU sheet; fixing glass beads made of beads with a refractive index of 2.2 to the semi-finished sheet; coating a thin film of transparent resin on the surface of the glass beads, and then forming an aluminum vacuum-coating layer on the coated thin film and forming a reflective resin layer transparent, colored or with graphics on the surface of the aluminum vacuum-coating layer and then producing a transfer sheet by forming a transparent hot melt resin layer on the surface of the reflective resin layer of the semi-finished sheet subject.

2 Claims, 1 Drawing Sheet

METHOD OF PRODUCING A RETRO-REFLECTIVE HEAT TRANSFER FILM WITH A TRANSPARENT PROTECTIVE SHEET FOR WHOLE SURFACE

BACKGROUND OF THE INVENTION

1. Technical Field

The present invention is related to a method of producing a retro-reflective heat transfer film with a transparent protective sheet for the whole surface thereof, and, in particular, to a retro-reflective heat transfer film excellent in physical durability, flexibility, secondary workability, change-resistance, resistance to ultraviolet rays, water resistance, weather resistance, salt resistance, solvent resistance, etc. without lowering luminance, and uses a transparent TPU sheet 1 as a base substrate instead of normal backing material already produced.

2. Description of the Conventional Method

A retro-reflective sheet is widely used for safety clothes, fire clothes, safety articles, safety equipment, sportswear, shoes, decorations and the like. Thanks to its retro-reflective function when it receives light, it can achieve peculiar design while, because the glass bead layer is exposed on the surface, it lacks in physical durability, thus causing damages in the glass bead layer when friction or impact is applied to lower the capability of retro-reflection and to exhibit bad appearance, disadvantageously resulting in lowering product quality.

The exposed glass beads causes bad change resistance and can be easily removed, and polluted by foreign matters such as dust or fume, etc., causing significantly lowered capability of retro-reflection. In such a case, it is not easy to clean the sheet (because the glass beads can be removed). Significantly reduced resistance to ultraviolet rays lowers the capability of adhesiveness and retro-reflection and in addition causes bad secondary workability and restricts its application to various articles. Additionally, when the retro-reflective sheet is attached to different material or the retro-reflective sheet to leather or rubber, the glass bead layer is easily separated because of its bad adhesiveness, thereby causing products to be rejected and also product durability to be lowered. Therefore, to overcome the aforementioned problems, there is a continuous need for improving the disadvantages.

On the other hand, very heavy and expensive plate-type articles have been devised where a retro-reflective sheet is fixed on the surface of a plate such as safety plates on a road, etc. and the surface of the retro-reflective sheet is then coated thick with transparent urethane or transparent resin, etc. However, such an application is not a transfer sheet that can be applied and available to many products, but is a simple example of application of the retro-reflective sheet. Accordingly it cannot be compared to the invention.

BRIEF SUMMARY OF THE INVENTION

It is an object of the present invention to solve the aforementioned problems and disadvantages of conventional retro-reflective sheets and to provide a method of producing a retro-reflective sheet, the invention comprising the steps of: heat-joining a PET release film 2 and a transparent TPU sheet 1 in order to prevent thermal strains during processing, in step 1; forming a sticky-adhesive layer or a hot melt adhesive layer 3 on the surface of the transparent TPU sheet 1 subject to the above step 1, in step 2; fixing glass beads 4 with a refractive index of 2.2 to a semi-finished sheet subject to the step 2, in step 3; coating a thin film of transparent resin on the surface of the glass beads 4 of the semi-finished sheet subject to the above step 3 and then forming an aluminum vacuum-coating layer 5 on the coated thin film, in step 4; forming a reflective resin layer 6 transparent, colored or with graphics on the surface of the aluminum vacuum-coating layer of the semi-finished sheet 5 subject to the above step 4, in step 5; and producing a transfer sheet by forming a transparent hot melt resin layer 7 on the surface of the reflective resin layer 6 of the semi-finished sheet subject to the above step 5, in step 6.

BRIEF DESCRIPTION OF THE DRAWINGS

The features and advantages of the present invention will become apparent from the following detailed description of a preferred embodiment thereof illustrated with reference to the accompanying drawings, wherein.

DETAILED DESCRIPTION OF THE PREFERRED EMBODIMENT

When applying the invention as described hereinafter, it should be noted that the vacuum coating technology for forming an aluminum vacuum-coating layer on the glass beads, the technology for forming a hot melt resin layer, the technology for forming a sticky-adhesive layer, the technology for forming a reflective resin layer, transfer temperature, other material joining technology is known in the patents already registered by the inventor in Korea. It should also be noted that, since the diameter of glass beads, thickness of each layer, sheet thickness and the like can be varied depending on customer's requirements, particular specifications are thus not mentioned.

Figure 1A:
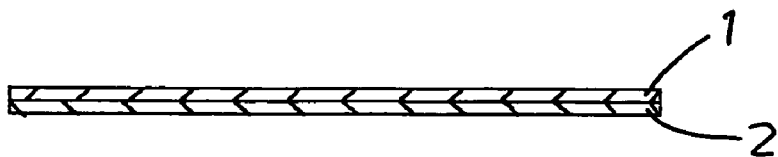
FIGS. 1a to 1e show schematically processes according to embodiments of the invention.

The figures of the inventions show schematically the embodiments of the invention, and do not include the process for using apparatuses already known. On the basis of the principle, the invention will be described hereinafter. As shown in FIG. 1a, the PET release film 2 is first used in order to prevent thermal strains (to keep leveling) when carrying out a series of process of the invention. The film 2 and a transparent TPU sheet 1 are heat-joined to incorporate them in step 1.

Figure 1B:
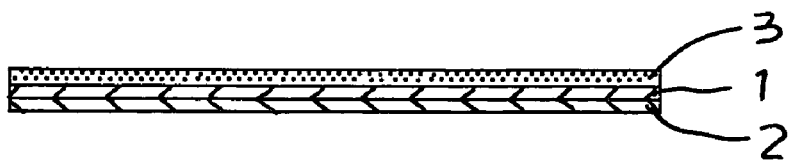
Figure 1C:
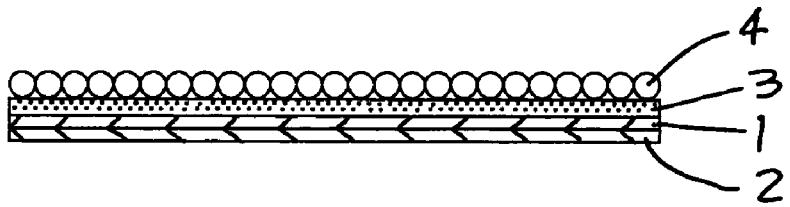
Figure 1D:
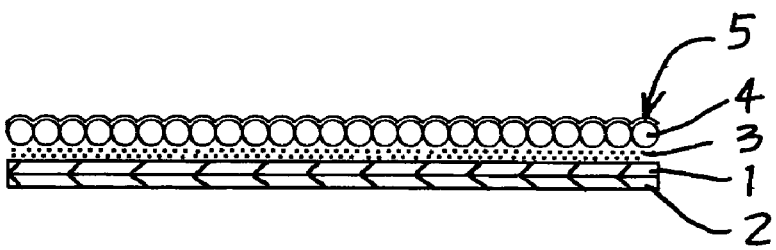

As shown in FIG. 1b thereafter, a sticky-adhesive layer or a hot melt adhesive layer 3 is formed on the surface of the transparent TPU sheet 1 in step 2. Subsequently, as shown in FIG. 1c, glass beads 4 are fixed on the sticky-adhesive layer 3 in step 3. As shown in FIG. 1d, transparent resin is then coated as a thin film on the surface of the glass beads 4 on which an aluminum vacuum-coating layer 5 is formed in step 4. Here, the glass beads 4 must be beads of 2.2 in a refractive index. Otherwise, beads do not exhibit a proper luminance when carrying out the invention. Also, in step 4, the aluminum vacuum-coating layer 5 can be replaced by color resin, which exhibit color while achieving reflective capability.

Figure 1E:
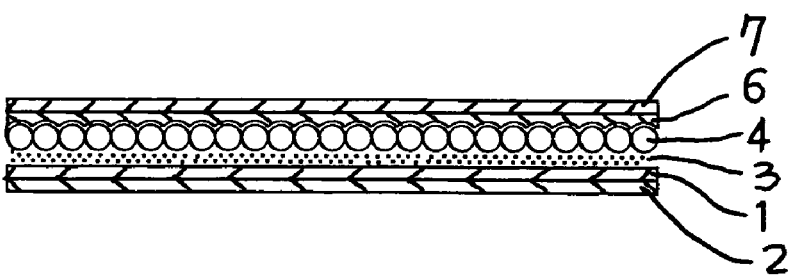

As shown in FIG. 1e, a transparent or colored reflective resin layer 6 or a reflective resin layer 6 with unicolored or multicolored graphics is then formed on the surface of the aluminum vacuum-coating layer 5 in step 5. If the reflective resin layer 6 is transparent, it means that it achieves the most fundamental retro-reflection capability, and if it is colored, it means it can achieve retro-reflection showing a specific color. When it is a unicolored or multicolored layer 6 while having graphics, it can be used in products, logos, commercial promotions, safety signs, etc. The technology for forming the reflective resin layer 6 is also disclosed in some patents and utility models previously registered by the inventor in Korea. Therefore, the technology will not be described in detailed herein.

Subsequently, on the surface of the reflective resin layer 6 of the semi-finished sheet subject to the step 5, a transparent hot melt resin layer 7 is formed again to produce a transfer sheet in step 6, wherein the layer 7 is used to fix a backing material to the inventive sheet.

Figure 1F:
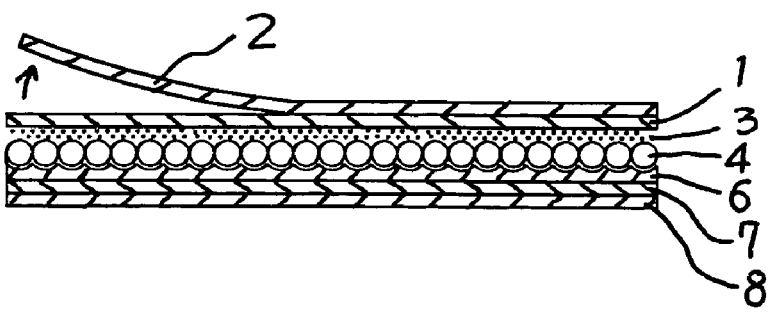
FIG. 1f shows the state when the invention is applied.

As shown in FIG. 1*f*, the resulting sheet is transferred and joined to various backing materials 8 such as textile, leather, a plate body, metal, etc. and the PET release film 2 is then removed or the inventive sheet is joined to the backing material 8 after removing the PET release film 2 in advance, so that the transparent TPU sheet 1 is exposed in the air and other components are protected between the backing material 8 and the TPU sheet 1 as shown in the FIG. 1*f* to settle and solve disadvantages and problems of conventional retro-reflective sheets.

In addition, the inventive sheet is excellent in physical properties including flexibility and durability, change resistance, resistance to ultraviolet rays, water resistance, weather resistance, salt resistance, solvent resistance and adhesiveness. Since the TPU sheet 1 is used as a surface protective means that allows easy secondary working, such as pressing or high-frequency molding, the sheet can be used as a safe sheet excellent in durability without lowering luminance although it is modified into any shape to produce an article.

The inventive sheet can be produced and used at cheaper prices and with lighter weight as compared to conventional sheets, even in the fields of traffic sign plates, traffic guide pates as well as clothes, decorations, safety articles, shoes, etc. It was seen that, without removal of the glass beads, the inventive sheet can be easily and conveniently cleaned with water and can be subject to pressing, high-frequency molding, sewing, adhesion, etc. without causing any problems.

In addition, when carrying out the invention, there may or may not be the aluminum vacuum-coating layer 5 depending on customer's requirements. It is desired that the aluminum vacuum-coating layer 5 is formed, but, since reflection can be achieved by means of the reflective resin layer 6, the aluminum vacuum-coating layer 5 can be omitted depending on features of articles to be produced. Forming or not forming the aluminum vacuum-coating layer 5 as such is recognized as a known technology in the art, so that it will be apparent that carrying out the invention without forming the aluminum vacuum-coating layer 5 also falls under the technical category of the invention.

From the foregoing description, it will be observed that various modifications and changes can be made without departing from the true sprit and scope of the present invention. It should be understood that the foregoing description is intended to illustrate and not to limit the scope of the invention as defined by the claims.

What is claimed is:

1. A method of producing a retro-reflective heat transfer film with a transparent protective sheet for the whole surface, comprises the steps of:
   A. heat-joining a PET release film (2) and a transparent TPU sheet (1);
   B. forming a sticky-adhesive layer or a hot melt adhesive layer (3) on the surface of the transparent TPU sheet (1) subject to step A;
   C. fixing glass beads (4) made of beads with a refractive index of 2.2 to the semi-finished sheet subject to step B;
   D. coating a thin film of transparent resin on the surface of the glass beads (4) of the semi-finished sheet subject to step C, and then forming an aluminum vacuum-coating layer (5) on the coated thin film;
   E. forming a reflective resin layer (6) transparent, colored or with graphics on the surface of the aluminum vacuum-coating layer (5) of the semi-finished sheet subject to step D; and
   F. producing a transfer sheet by forming a transparent hot melt resin layer (7) on the surface of the reflective resin layer (6) of the semi-finished sheet subject to the above fifth step.

2. The method of claim 1, wherein the aluminum vacuum-coating layer is replaced by color resin.

* * * * *